United States Patent
Park et al.

(10) Patent No.: US 9,757,924 B2
(45) Date of Patent: Sep. 12, 2017

(54) LIGHTING DEVICE AND LIQUID CRYSTAL DISPLAY USING THE SAME

(75) Inventors: Moo Ryong Park, Seoul (KR); Chul Hong Kim, Seoul (KR); Byoung Eon Lee, Seoul (KR); Kwang Ho Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 508 days.

(21) Appl. No.: 13/558,949

(22) Filed: Jul. 26, 2012

(65) Prior Publication Data

US 2013/0027633 A1    Jan. 31, 2013

(30) Foreign Application Priority Data

Jul. 29, 2011  (KR) .................. 10-2011-0076259
Feb. 21, 2012  (KR) .................. 10-2012-0017285

(51) Int. Cl.
  *G02F 1/1335*  (2006.01)
  *B32B 7/14*  (2006.01)
  (Continued)

(52) U.S. Cl.
  CPC .............. *B32B 7/14* (2013.01); *B32B 27/08* (2013.01); *B32B 27/36* (2013.01); *G02B 5/124* (2013.01);
  (Continued)

(58) Field of Classification Search
  CPC  B32B 7/14; B32B 27/08; B32B 27/36; B32B 2307/416; G02B 5/124;
  (Continued)

(56) References Cited

U.S. PATENT DOCUMENTS 3,861,135 A * 1/1975 Seeger et al. ................... 368/88
6,480,249 B2 * 11/2002 Iwata et al. ................... 349/112
(Continued)

FOREIGN PATENT DOCUMENTS

CN    201170472 Y    12/2008
CN    103597270 A     2/2014
(Continued)

OTHER PUBLICATIONS

International Search Report in International Application No. PCT/KR2012/005980, filed Jul. 26, 2012.
(Continued)

*Primary Examiner* — Edward Glick
*Assistant Examiner* — David Chung
(74) *Attorney, Agent, or Firm* — Saliwanchik, Lloyd & Eisenschenk

(57) ABSTRACT

Provided is a lighting device comprising: a plurality of LED light sources formed on a printed circuit board; and a reflective unit stacked on the printed circuit board in a structure in which the LED light sources penetrate, wherein the reflective unit comprises a first reflective film and a second reflective film disposed to oppose to each other, and a first adhesive pattern layer which bonds the first and second reflective films, and in which a plurality of unit air cells having a first air area formed in an inner part thereof are closely disposed to communicate with each other.
According to the present invention, it is advantageous that the improvement of luminance as well as the improvement of light reflectance can be maximized by providing the reflective unit having an air area to a surface of the printed circuit board.

7 Claims, 7 Drawing Sheets

(51) Int. Cl.
*B32B 27/08* (2006.01)
*B32B 27/36* (2006.01)
*G02B 5/124* (2006.01)
*F21V 8/00* (2006.01)

(52) U.S. Cl.
CPC ..... *G02B 6/0055* (2013.01); *G02F 1/133603* (2013.01); *G02F 1/133605* (2013.01); *B32B 2307/416* (2013.01); *G02F 1/133512* (2013.01); *G02F 1/133606* (2013.01); *G02F 2001/133628* (2013.01); *G02F 2202/28* (2013.01)

(58) Field of Classification Search
CPC ............. G02B 6/0055; G02F 1/133512; G02F 1/133603; G02F 1/133605; G02F 1/133606; G02F 2001/133628; G02F 2202/28
USPC .............. 349/58–67, 149–152; 362/600–632
See application file for complete search history.

(56) References Cited

U.S. PATENT DOCUMENTS

| | | | |
|---|---|---|---|
| 7,009,771 B2 * | 3/2006 | Bourdelais et al. | 359/599 |
| 7,530,711 B2 * | 5/2009 | Bang | G02F 1/133603 362/227 |
| 7,658,504 B2 * | 2/2010 | Moriyasu | G02F 1/133603 349/69 |
| 8,251,529 B2 | 8/2012 | Boonekamp et al. | |
| 2003/0142247 A1 * | 7/2003 | Nishiyama et al. | 349/67 |
| 2004/0109105 A1 * | 6/2004 | Nagakubo et al. | 349/65 |
| 2004/0218390 A1 | 11/2004 | Holman et al. | |
| 2009/0162617 A1 | 6/2009 | Moroishi et al. | |
| 2009/0231510 A1 * | 9/2009 | Takahashi | 349/61 |
| 2009/0244885 A1 | 10/2009 | Watanabe et al. | |
| 2009/0273735 A1 * | 11/2009 | Yeh | 349/67 |
| 2010/0128201 A1 * | 5/2010 | Lee | G02F 1/13452 349/62 |
| 2010/0141867 A1 | 6/2010 | Ogihara et al. | |
| 2011/0050743 A1 | 3/2011 | Park et al. | |
| 2011/0051044 A1 * | 3/2011 | Segawa | 349/64 |
| 2011/0141389 A1 * | 6/2011 | Tabor | G02F 1/133308 349/58 |

FOREIGN PATENT DOCUMENTS

| | | |
|---|---|---|
| EP | 2081079 A2 | 7/2009 |
| GB | 2427744 A | 1/2007 |
| JP | 1997-202871 A | 8/1997 |
| JP | 1998-160938 A | 6/1998 |
| JP | 2000-180633 A | 6/2000 |
| JP | 2003-222714 A | 8/2003 |
| JP | 2004-095422 A | 3/2004 |
| KR | 10-2008-0043905 A | 5/2008 |
| KR | 10-2008-0075895 A | 8/2008 |
| KR | 10-2009-0064350 A | 6/2009 |
| KR | 10-2009-0079929 A | 7/2009 |
| TW | 200946976 A | 11/2009 |
| TW | 200947064 A | 11/2009 |
| TW | 201116900 A | 5/2011 |
| WO | WO-2006/093087 A1 | 9/2006 |
| WO | WO-2010/123284 A2 | 10/2010 |
| WO | WO-2011/025174 A2 | 3/2011 |

OTHER PUBLICATIONS

Taiwanese Office Action dated Sep. 14, 2014 in Taiwanese Application No. 101127159.
European Search Report dated Mar. 20, 2015 in European Application No. 12820135.7.

* cited by examiner

| SAMPLE | (A)Ag REFLECTIVE FILM 1 | (B)Ag REFLECTIVE FILM 2 | (C) White PET |
|---|---|---|---|
| Pattern material | - | Silicon | Silicon |
| Line Width/Pitch (um) | - | 300/2000 | 300/2000 |
| Rank | M3-D42 | M3-D42 | M3-D42 |
| COMPARISON OF LUMINANCE — LUMINANCE | 6605 | 7468 | 8472 |
| COMPARISON OF LUMINANCE — LUMINANCE INCREASING RATE | Ref. | 13% | 28.6% |
| CIE X | 0.28670 | 0.28658 | 0.28979 |
| CIE Y | 0.25721 | 0.25685 | 0.26386 |
| PATTERN SHAPE | | | |

LIGHTING DEVICE AND LIQUID CRYSTAL DISPLAY USING THE SAME

CROSS-REFERENCE TO RELATED APPLICATION

This application claims the benefit under 35 U.S.C §119 of Korean Patent Application Nos. 10-2011-0076259, filed Jul. 29, 2011, and 10-2012-0017285, filed Feb. 21, 2012, which are hereby incorporated by reference in their entirety.

BACKGROUND

Field of the Invention

The present invention relates to a lighting device using an LED as a lighting source, more specifically, to a backlight unit, a liquid crystal display device, and a lamp device for vehicles using the lighting device.

Description of the Related Arts

A device implementing lighting by guiding light emitting at a light source has been variously required for a lamp for lighting, a lamp for vehicles, a liquid crystal display device and the like. In the lighting device, a technology for making the structure of equipment thin, and a structure capable of improving light efficiency have been recognized as the most important technologies.

As one example in which the lighting device is operated, a liquid crystal display device is explained as follows.

Referring to FIG. 1, the lighting device 1 is configured such that a flat light guide plate 30 is disposed on a substrate 20, and a plurality of side-view LEDs 10 (showing only one LED) are disposed in an array type on a side surface of the light guide plate 30.

In the LEDs 10, light L incident to the light guide plate 30 is reflected upward by a fine reflective pattern or a reflection sheet 40 provided a bottom surface of the light guide plate and is emitted from the light guide plate 30. Thereafter, the light is provided to an LCD panel 50 of an upper part of the light guide plate 30.

Like a conceptual view illustrated in FIG. 2, the lighting device may be formed in a structure in which a plurality of optical sheets such as an optical sheet 31, prism sheets 32 and 33, and a protective sheet 34, or the like, are further added between the light guide plate 30 and the LCD panel 50.

Accordingly, the light guide plate is basically used as an essential component of the lighting device. However, due to a thickness of the light guide plate itself, there is a limitation to make a whole thickness of a product thin. In the case of a large-scaled lighting device, it is problematic that image quality is deteriorated.

BRIEF SUMMARY

An aspect of the present invention provides a lighting device capable of maximizing the improvement of luminance as well as the improvement of light reflectance, improving luminance even without an increase in a thickness of the lighting device or the number of light sources, and maximizing the control of light and reflection efficiency by forming a reflective unit having an air area in which an adhesive material is patterned on a surface of a printed circuit board, and implementing a communication hole having a structure in which unit cells implementing the air area communicate with each other.

According to an aspect of the present invention, there is provided a lighting device including: a plurality of LED light sources formed on a printed circuit board; and a reflective unit stacked on the printed circuit board in a structure in which the LED light sources penetrate, wherein the reflective unit includes: a first reflective film and a second reflective film disposed to oppose each other; and a first adhesive pattern layer which bonds the first and second reflective films, and is closely disposed in a structure in which a plurality of unit air cells having a first air area formed in an inner part thereof communicate with each other.

In particular, in this case, the first adhesive pattern layer is patterned in a structure of an adhesive partition body having a structure in which an upper part of the unit air cells is opened. Each adhesive partition body is closely disposed in plural numbers, and has at least one or more communication holes to thereby communicate with each other.

Furthermore, the first adhesive pattern layer may be implemented in a structure in which the unit air cells are disposed in a same plane shape or are disposed in a structure having a plurality of different plane shapes.

Moreover, the first adhesive pattern layer has a polygonal structure in a same shape, and the communication holes may be formed on one or more vertex parts of a polygon.

Furthermore, the first reflective film may include a first member stacked on a base substrate and a metal layer stacked on the first member and the second reflective film is spaced apart from the first reflective film to thereby form a first air area and is formed of a transparent material.

Furthermore, the first reflective film may be composed of white PET (polyethylene terephthalate), which is adhered to a surface of the printed circuit board and the second reflective film is spaced apart from the another first reflective film to thereby form the first air area and is formed of a transparent material.

Furthermore, the first adhesive pattern layer may be formed using a heat curing PSA (Pressure Sensitive Adhesive), a heat curing adhesive, and an ultraviolet curing PSA type material.

In addition, in the case of the second reflective film, a reflective pattern may further be formed on a surface of the second reflective film. In this case, the reflective pattern may be formed by applying a reflective ink including one of $TiO_2$, $CaCO_3$, $BaSO_4$, $Al_2O_3$, Silicon, and PS.

In particular, the lighting device according to an exemplary embodiment of the present invention may further include a resin layer stacked on an upper surface the reflective unit to be higher than a height of the LED light source. In this case, the resin layer may further include 0.01 to 0.3 wt. % of a bead increasing the reflection of light to a total weight of the resin layer.

In particular, the lighting device according to another exemplary embodiment of the present invention may further include an optical pattern layer which is disposed on an upper part of the resin layer to thereby implement an optical pattern for diffusing light. In this case, the optical pattern may be formed of a raw material including one or more materials selected from $TiO_2$, $CaCO_3$, $BaSO_4$, $Al_2O_3$, Silicon, and PS.

Particularly, the optical pattern layer according to still another exemplary embodiment of the present invention may include a second adhesive pattern layer which forms a second air area surrounding around the optical pattern.

Furthermore, the optical pattern layer may have a first substrate and a second substrate including the optical pattern in an inner part thereof, and the second adhesive pattern layer may be coated with remaining parts except for the second air area surrounding around of the optical pattern.

In particular, a plane shape of the second air area formed by the second adhesive pattern layer of the optical pattern layer may be formed in one shape of a circle, an ellipse, a rectangle, a square, and a polygon.

Furthermore, the lighting device according to still another exemplary embodiment of the present invention may further include a diffusion plate disposed on an upper part of the optical pattern layer, and an air gap module having a third air area may be further provided between the optical pattern layer and the diffusion plate.

In this case, the air gap module may be formed in an integral structure which implements the third air area and a bridge by patterning a lower part of the diffusion plate.

Furthermore, the air gap module may be formed in a structure in which the third air area is provided by forming the bridge as an independent spacer member in the lower part of the diffusion plate.

The lighting device having the aforesaid structure according to the exemplary embodiment of the present invention may be applied as a backlight unit of a liquid crystal display device.

According to exemplary embodiments of the present invention, it is advantageous that the improvement of luminance as well as the improvement of light reflectance can be maximized and luminance can be enhanced without an increase in a thickness of the lighting device or the number of light sources by providing the reflective unit having the air area on the surface of the printed circuit board, and thanks to a pattern design of the separation member (the spacer) which forms the air area, light control and reflection efficiency can be also maximized.

In particular, it is advantageous that a reflection rate of a surface of the metal layer which is the first reflective film or the element of white PET (polyethylen terephthalate) is improved to thereby maximize light efficiency by forming the first air area, which is an air layer area within the reflective unit, in a structure in which unit air cells may communicate with each other.

Furthermore, the present invention is provided with the effect that the optical pattern layer having an optical pattern is formed to have the air area by patterning the adhesive material (i.e. the adhesive pattern layer), so hot spots and dark spaces generated in a light shielding pattern part can be removed, reliability between components bonded to the adhesive material can be secured, a lighting device without a significant difference between the optical characteristics can be implemented, and accurate align between the components can be performed.

Furthermore, it is advantageous that the optical characteristics of the lighting device such as diffusion, and light uniformity can be improved in such a manner that the air gap module having the air layer by patterning or using a separate member is provided to the diffusion plate.

In addition, it is advantageous that the number of light sources can be reduced, a whole thickness of the lighting device can be thinner, and a degree of freedom in a product design can be enhanced by removing an essential light guide plate from a structure of a general lighting device and forming a structure that guides a light source using the resin layer in a film type.

In particular, it is advantageous that the number of light sources can be largely reduced, and at the same time, optical characteristics can be secured by mounting the side-view light emitting diode in a direct type, and that the lighting device can be also applied to the structure of a flexible display by removing the light guide, and stable light emitting characteristics can be secured by providing the diffusion plate including the reflective film including the reflective pattern, and the air layer to the resin layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
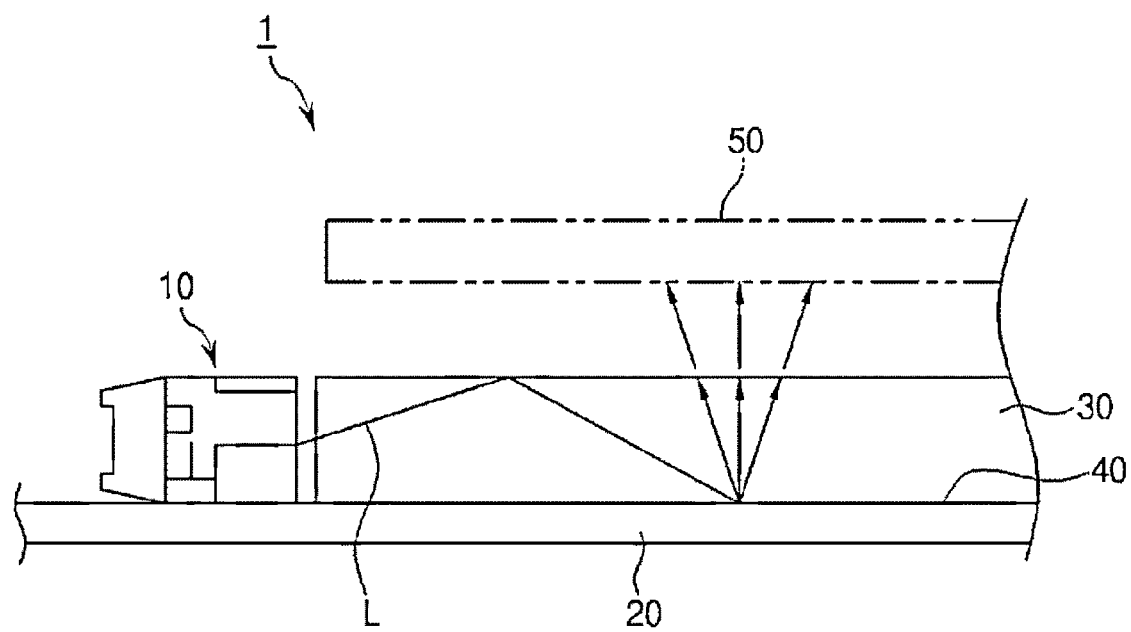
FIG. 1 and FIG. 2 are conceptual views illustrating a structure of a conventional lighting device.
Figure 2:
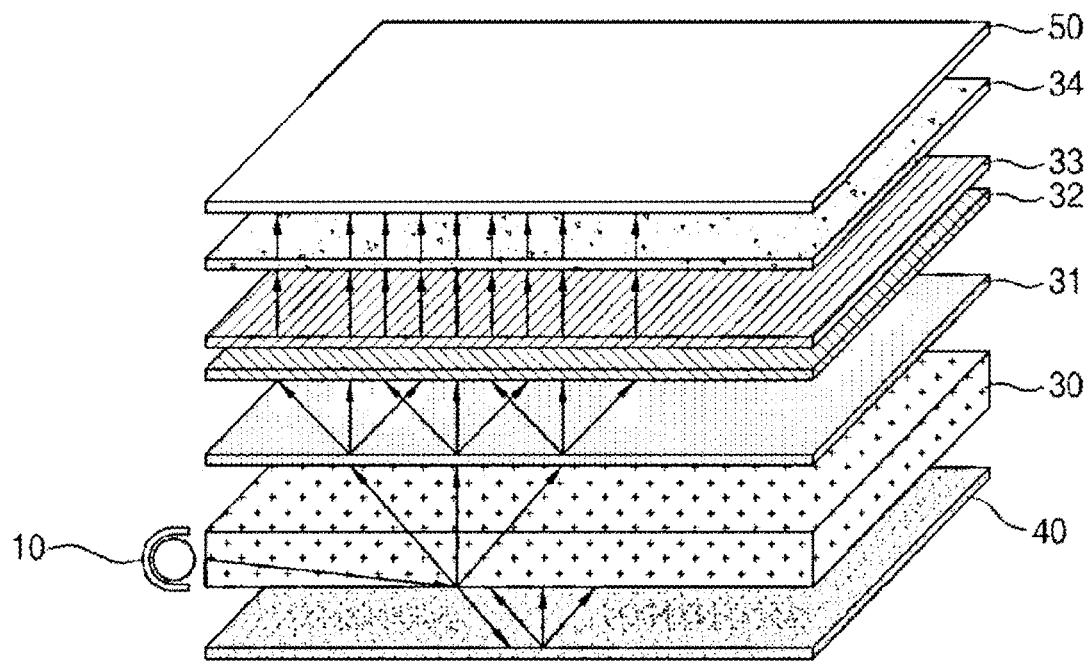

Exemplary embodiments according to the present invention will now be described more fully hereinafter with reference to the accompanying drawings. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

The gist of the present invention is to provide a lighting device using an LED as a light source, which can improve reflectance and luminance in such a manner that a reflective unit having an air area is disposed in a lower part of an LED light source. Particularly, the gist is that unit air cells of the reflective unit are shaped to include an adhesive pattern layer having a structure in which each unit air cell having communication holes which communicate with each other is disposed, thereby being capable of more improving reflectance.

When the lighting device is implemented, in addition to the structure of the conventional lighting device, an optical pattern layer implementing an air area by patterning an adhesive material or an air gap module having an air layer formed by patterning a diffusion plate or using a separate member is further provided so that optical characteristics can be improved, and in particular, a light guide plate is removed and a resin layer instead of the light guide plate is formed so that a whole thickness of the lighting device can be remarkably reduced, and a structure which can reduce the number of light sources can be provided.

The lighting device according to an exemplary embodiment of the present invention is not limited to being applied as a backlight unit of a liquid crystal display device. That is, the lighting device may be naturally applied to various lamp devices which require lighting such as a lamp for vehicles, a home lighting device, and an industrial lighting device. In the lamp for vehicles, it may be also applied to a headlight, indoor illumination, a back light and the like.

1. First Exemplary Embodiment

Figure 3:
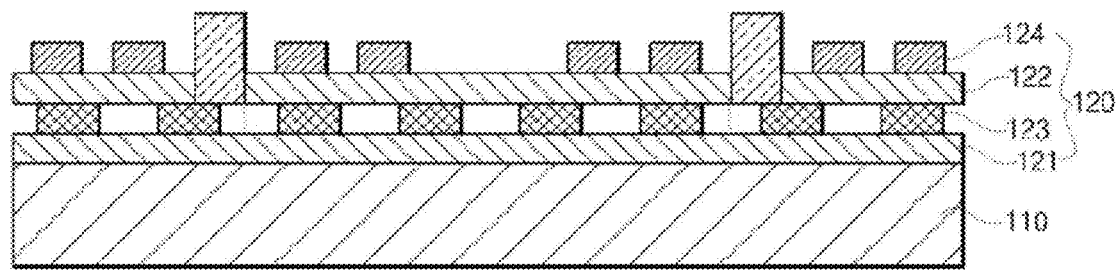
FIG. 3 is a cross-section concept view illustrating the subject matter of a lighting device according to an exemplary embodiment of the present invention.
Figure 4:
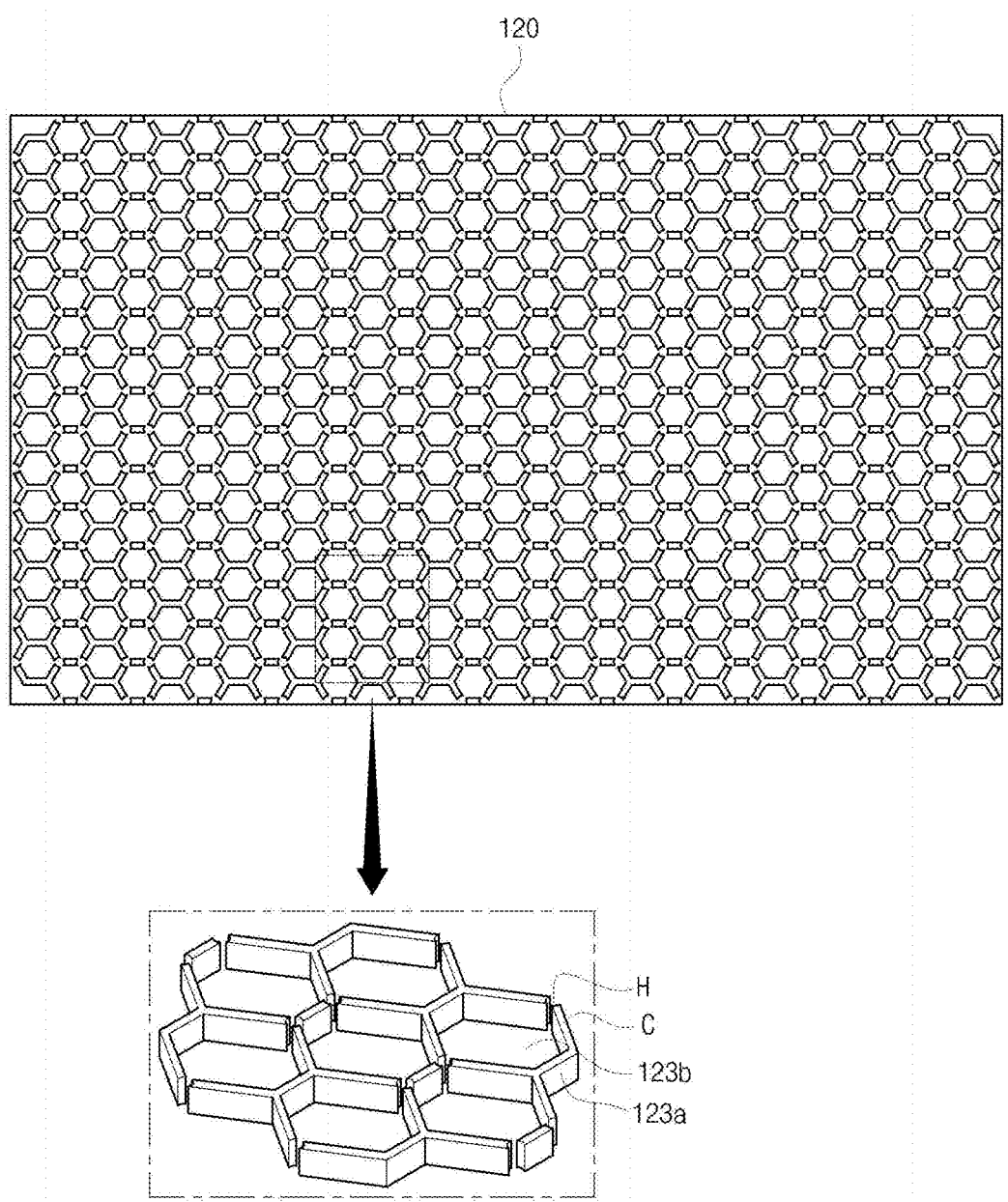
FIG. 4 and FIG. 5 illustrate one exemplified embodiment of a separation member which forms a reflective unit included in the lighting device according to the exemplary embodiment of the present invention as described in FIG. 3.

FIG. 3 is a cross-section conceptual view illustrating the subject matter of a lighting device according to an exemplary embodiment of the present invention. FIG. 4 is an enlarged view of the subject matters for explaining the detailed configuration of the reflective unit in the structure of FIG. 3.

Referring to FIG. 3, the lighting device according to the exemplary embodiment of the present invention may include: a plurality of LED light sources 130 formed on a printed circuit board 110; and a reflective unit 120 stacked on the printed circuit board 110 in a structure in which the LED light sources 130 penetrate, at an upper surface of the printed circuit board 110. In particular, in this case, an air area A1 is provided in an inner part of the reflective unit 120. The air area A1 may maximize luminance by improving the reflection efficiency of light emitted from the LED light sources 130. Particularly, the reflective unit 120 may include: a first reflective film 121 and a second reflective film 122 which are disposed to oppose to each other; and a first adhesive pattern layer 123 which bonds the first and second reflective films, and in which a plurality of unit air cells having a first air area formed in an inner part thereof are closely disposed to communicate with each other.

In this case, the reflective unit may include the first reflective film 121 which is composed of a base substrate having a metal layer adhered to a surface of the printed circuit board 110 or white PET (polyethylen terephthalate); and the second reflective film 122 which is spaced apart from the first reflective film 121 to thereby form the first air area 123b and is formed of a transparent material. The first and second reflective films 121, 122 are stacked on the printed circuit board, and penetrate a hole formed on the reflective films so that the LED light source 130 is protruded to the outside.

Based on a cross-section structure of the reflective unit 120 in the structure of FIG. 3, and referring to the structure of FIG. 4, the first adhesive pattern layer 123 of a structure which is patterned on the first reflective film 121 is formed in a structure in which a plurality of unit air cells C are disposed to adhere to each other. The unit air cell C forms an adhesive partition body 123a so that the first air area 123b is formed in the inner part of the unit air cell, and an upper surface thereof having the structure which forms the adhesive partition body 123a may be formed in an opened structure. In particular, in this case, in the structure in the plurality of unit air cells C are disposed to adhere to each other, each unit air cell C may be implemented in a structure in which at least one or more communication holes H are disposed to thereby communicate air between each unit air cell. The presence of the first adhesive pattern layer 123 which is formed in an adhered structure of the aforesaid unit air cells C is resulted in maximizing reflectance during the process that light emitted from the light source is transmitted through the second reflective film formed of a transparent material, and is again reflected from the second reflective film.

This is, the unit air cells C may be implemented in a two-dimensional or three dimensional structure in which the plurality of the adhesive partition bodies 123a implementing a cavity in an inner part thereof are disposed, and the first air area 123b is implemented in a vacant structure in an inner side of the adhesive partition body 123a. That is, a cross-section of the adhesive partition body 123a may be implemented in various shapes such as a polygon, a circle, an ellipse and the like. In particular, as illustrated, in addition to the structure in which each adhesive partition body 123a is closely disposed in plural numbers, each adhesive partition body 123a is disposed in a irregular structure so that the first air area 123b of an inner part of an unit separation member 123a and the second air area 123c of a vacant space between each unit separation member 123a may be implemented.

Figure 5:
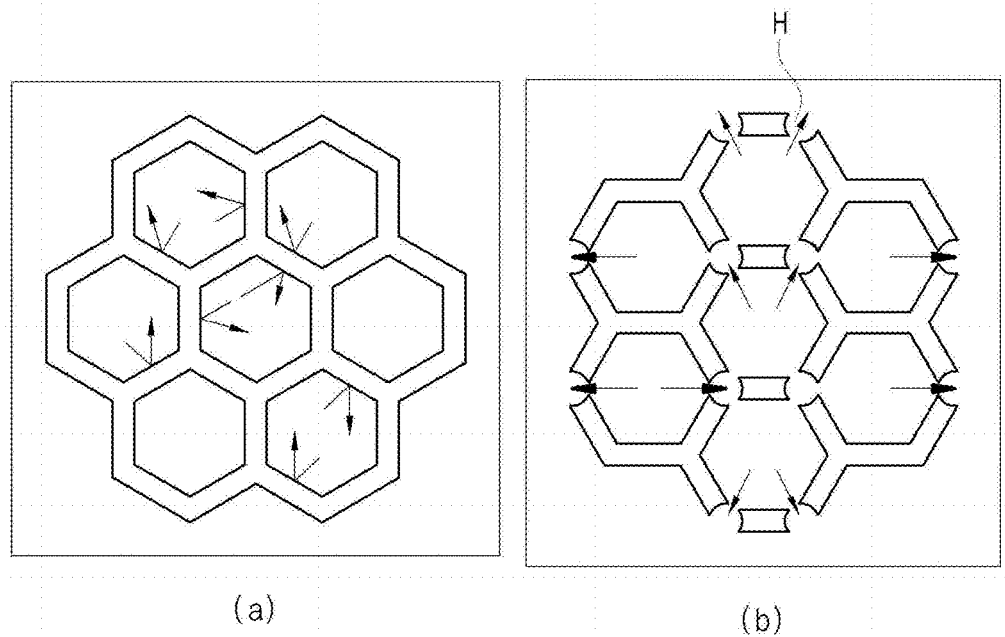

In particularly, like a structure illustrated in FIG. 5, (a) reflection efficiency can be enhanced by a structure in which in the inner part of each unit air cell, the reflection light (arrow) of light is autonomously reflected within the first air area 123b, and (b) in particular, in a case where the communication hole H implemented in the present invention is implemented, the reflection efficiency of the reflection light (arrow) can be more improved through the communication hole. In particular, a structure of forming the communication hole of each unit air cell C may be implemented such that the communication hole is formed in one or more vertex parts, thereby achieving high efficiency. That is, it may be implemented so that three unit air cells may communication with each other by one communication hole.

The first reflective film 121 in which the adhesive pattern layer 123 is formed is a reflection construction which reflects light. In particular, in the present invention, the first reflective film may be modified in various structures.

Figure 6:
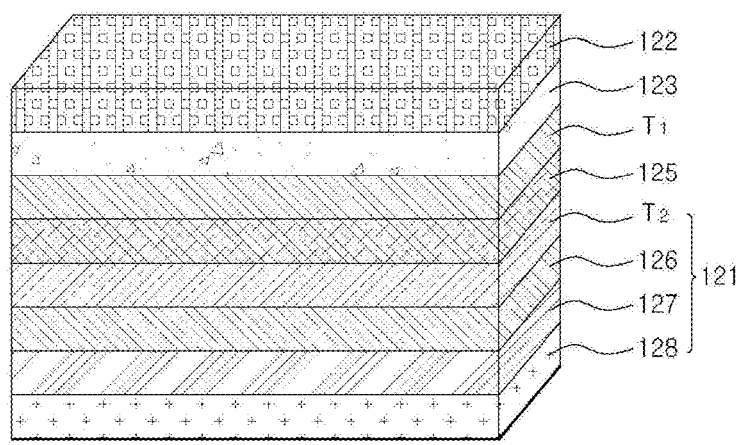
FIG. 6 illustrates one example of the configuration of the reflective unit according to the exemplary embodiment of the present invention.

In particular, like a structure illustrated in FIG. 6, the aforesaid adhesive pattern layer 123 is disposed, the first reflective film 122 formed of a transparent material is disposed on an upper part thereof. In particular, the second reflective film 122 may apply a film made of a transparent material such as PET and the like, and the air area may be formed by providing the first adhesive pattern layer 123 which separates the first and second reflective films 121, 122 from each other by patterning an adhesive material.

In particular, to maximize reflection efficiency, the first reflective film 121 may have an optical film 126 which bonds a metal reflective layer 125 by the medium of an adhesive (i.e. a primer). The optical film 126 may be implemented in a structure which is stacked on a release film 128 by the medium of an adhesive material 127 (PSA). In this case, the metal reflective layer 125 may use Ag.

Figures 7, 8:
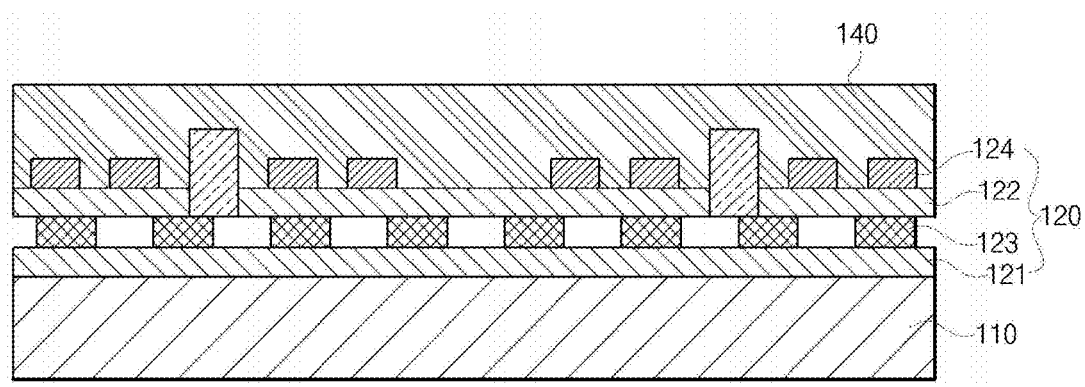
FIG. 7 is a result table comparing efficiency according to the kind of a second reflective film of the reflective unit according to the exemplary embodiment of the present invention.
FIG. 8 illustrates the lighting device according to another exemplary embodiment of the present invention.

Unlike this, as a simplified structure, the first reflective film 121 as the reflection construction which reflects light may use white PET (polyethylen terephthalate) in the present invention, particularly. That is, in the special reflective unit according to the present exemplary embodiment of the invention, the first reflective film may be implemented as general metal reflective material layers (Ag and the like). However, to achieve maximized effect of the improvement of luminance, white PET (polyethylen terephthalate) may be used (see FIG. 7). That is, in implementing the reflective unit according to the present exemplary embodiment of the invention, in a case where the white PET (white polyethylen terephthalate) is implemented as the first reflective film, the effect of the improvement of luminance of about 30% compared to a conventional reflective film may be implemented. That is, FIG. 7 is a result table for comparing a level in the improvement of luminance of the lighting device when the structure of the reflective unit according to the present exemplary embodiment of the invention is implemented. In the illustrated table, (A) is to measure luminance when only one reflective film implemented of Ag is formed on the surface of the printed circuit board, in the structure of FIG. 3, and (B) is to measure a result value of the improvement of luminance by comparing the conventional structure (A) with the structure of the reflective unit according to the present exemplary embodiment of the invention, namely, the structure in which an adhesive pattern material is formed of silicon to thereby form the pattern of FIG. 4, and the first reflective film is an Ag film. Furthermore, unlike (B), (C) is to measure a result value of the improvement of luminance by comparing the conventional structure (A) with the structure in which the first reflective film is formed of white PET. As measured results, in the case of (A), luminance is 6605 and in standard of this, in the structure of (B), luminance is 7468, thereby showing the result of luminance improvement of about 13%. Furthermore, in the case of (C) which implements the reflective unit including the white PET according to the present exemplary embodiment of the invention, luminance is 8472, thereby showing a luminance increasing ratio of 28.6% compared to (A). That is, in the case of using the white PET while providing the structure (the first air area) in which the adhesive material layer is patterned, the maximized result of luminance improvement of luminance can be achieved.

Furthermore, the second reflective film 122 according to the present exemplary embodiment of the invention may use a film made of a transparent material so that light emitted from the LED light source is transmitted onto the surface of the first reflective film 122 and is then reflected again.

In particular, in addition to the structure that the light emitted from the LED light source 130 penetrates the first reflective film and is again reflected from the second film, a reflective pattern 124 may be provided to a surface of the second reflective film 122 through white printing so that luminance can be improved by more promoting the dispersion of light. The reflective pattern may be provided so that the reflectance of light can be largely improved. The reflective pattern may be printed using a reflective ink including one of $TiO_2$, $CaCO_3$, $BaSO_4$, $Al_2O_3$, Silicon, and PS. In particularly, in the case of the lighting device according to the present exemplary embodiment of the present invention, various kinds of light sources may be applied as light sources. In particular, an LED having a side-view light emitting type structure may be used. In this case, the reflective pattern may be formed in a light emitting direction of the LED light source. Particularly, the reflective pattern may be disposed such that as the reflective pattern gradually moves away from a light emitting direction of the LED light sources, a density of the reflective pattern becomes high. In the case of implementing the LED having the side-view light emitting type structure, it is advantageous that the number of light sources can be largely reduced.

2. Second Exemplary Embodiment

FIG. 8 illustrates the lighting device according another exemplary embodiment of the present invention.

That is, in addition to the structure of the aforesaid first exemplary embodiment, the second exemplary embodiment according to the present invention implements a structure in which a resin layer 140 is stacked on the printed circuit board. The configuration of the resin layer corresponds to the configuration which substitutes for a light guide plate of the lighting device, and functions to guide the light emitted from the light source forward.

Referring to FIG. 8, the lighting device according to the present exemplary embodiment of the invention may further include the plurality of LED light sources 130 formed on the printed circuit board 110, and the resin layer 140 for diffusing and guiding emitted light forward. That is, the resin layer 140 is stacked in a structure surrounding around the LED light sources and functions to disperse the light of the light sources emitted in a side direction. That is, the function of the conventional light guide plate may be performed by the resin layer 140.

The resin layer may basically use any one if it is a resin made of a material which is able to diffuse light. As one example, for a main material of the resin layer as one exemplary embodiment according to the present invention, a resin containing urethane arcrylrate oligomers as a main material may be used. For example, a mixture of urethane arcrylrate oligomers which is a synthetic oligomer and a polymer type which is polyacryli may be used. Of course, here, a monomer mixing IBOA (isobornyl acrylate), HPA (Hydroxylpropyl acrylate), and 2-HEA (2-hydroxyethyl acrylate) which are low boiling point and diluted type reactive monomers may be further included. Furthermore, photoinitiators (i.e. 1-hydroxycyclohexyl phenyl-ketone and the like) or antioxidants and the like as additives may be mixed.

Moreover, the resin layer 140 may include a bead to improve the diffusion and reflection of light. The bead may range from 0.01 to 0.3 wt. % to a total weight of the resin layer. That is, the light emitted from the LED light source in the side direction is diffused and reflected through the resin layer 140 and the bead, thereby being capable of moving in an upper direction.

This may more promote a reflection function with the reflective unit 120 as previously described in the first exemplary embodiment according to the present invention. Accordingly, thanks to the presence of the resin layer, a thickness occupied by the conventional light guide plate can be innovatively reduced, so a whole product can be thinner and can have a ductile material, thereby being capable of achieving generality that is applicable to a flexible display.

3. Third Exemplary Embodiment

As an improved structure from the aforesaid structure of the second exemplary embodiment, a structure of the lighting device of the third exemplary embodiment in which the optical pattern layer for promoting the diffusion of light is implemented on the resin layer is explained.

Figure 9:
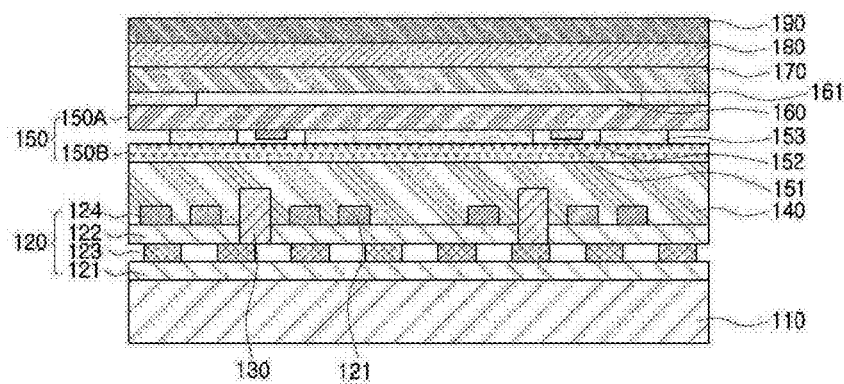
FIG. 9 illustrates the lighting device according to still another exemplary embodiment of the present invention.

That is, referring to FIG. 9, in the aforesaid structure of FIG. 8, the lighting device according to the present exemplary embodiment of the invention may be implemented in a structure in which an optical pattern layer 150 disposed on an upper part of the resin layer 140 and including an optical pattern 151 is provided.

In particular, the optical pattern layer 150 may be include a second pattern layer 153 which forms a second air area 152 surrounding around the optical pattern. That is, the second adhesive pattern layer 153 forms a spaced space (i.e. the second air area) having a pattern in a fixed shape in the optical pattern 151 and is implemented by applying and bonding an adhesive material to remaining parts except for the space. That is, in a structure of the illustrated drawing, in a disposition relationship between the optical pattern layer 150 and the second adhesive pattern layer 153, the optical pattern layer 150 has a first substrate 150A and a second substrate 150B including the optical pattern in an inner part thereof. The first adhesive pattern layer 153 is applied to the remaining parts except for the second air area 152 surrounding around the light shielding pattern to thereby bond the first substrate 150A and the second substrate 150B.

That is, the optical pattern 151 may be formed as the light shielding pattern which is formed to inhibit the concentration of light emitted from the LED light sources 130. For this, it is required to align between the optical pattern 151 and the LED light sources 130. After aligning is performed, it is bonded using an adhesive member for securing a fixing force.

The first substrate 150A and the second substrate 150B may use a substrate made of a material having an excellent light transmission rate. As one example, PET may be used. In this case, the optical pattern 151 disposed between the first substrate 150A and the second substrate 150B may basically function not to concentrate the light emitted from the LED light sources, and may be implemented by performing light shielding printing on one of the first substrate 150A and the second substrate 150B. Aligning may be implemented by bonding two substrates using the adhesive layer coated with an adhesive material in the structure surrounding around the shielding pattern. That is, a bonded structure of the first substrate 150A and the second substrate 150B may also implement the function to fix the printed light shielding pattern 151. Moreover, the adhesive layer may use a heat curing PSA, a heat curing adhesive, and an ultraviolet curing PSA type material.

When bonding the substrates by forming the second adhesive pattern layer 153, in a case where the substrates are bonded in a pattern structure which forms the second air area 152, the adhesive material may inhibit the occurrence of strong hot spots or dark spaces caused by overlapping the adhesive material on the light shielding pattern. Due to the presence of the air layer, the uniformity of light can be enhanced.

In addition to the aforesaid configurations, the lighting device according to the present exemplary embodiment of the invention having the aforesaid structure may further include a diffusion plate 170 on an upper part of the resin layer, and an air gap module 160 having a third air area 161 between the diffusion plate 170 and the optical pattern layer 150. Moreover, a prism sheet, a protective sheet and the like may be additionally provided to an upper part of the diffusion plate.

Figure 10:
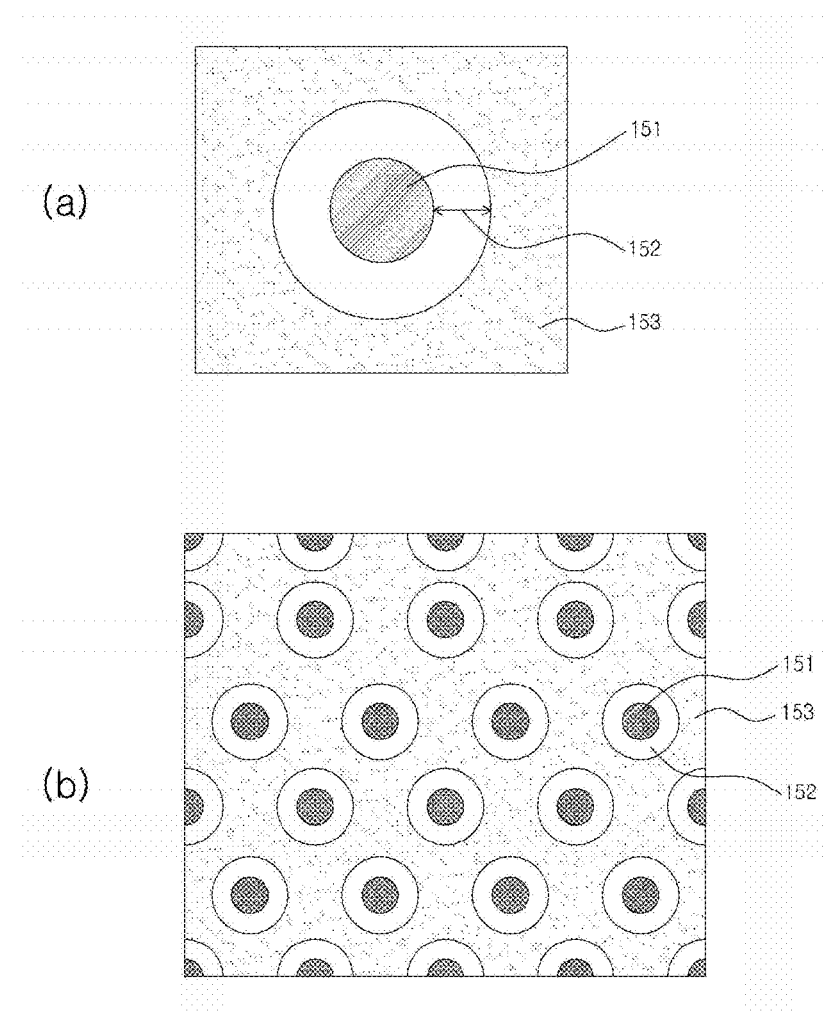
FIG. 10 and FIG. 11 illustrate various exemplified embodiments which are implemented in an optical pattern layer and a diffusion plate according to the present invention.

FIG. 10 is to conceptually illustrate the configurations of the optical pattern 151 and the second adhesive pattern layer 153, and the second air area 152 formed by the same.

When the second adhesive pattern layer 153 is formed using an adhesive material in a structure surrounding the around the optical pattern 151 printed on the first substrate in a specific pattern, in a case where the second substrate 150B is bonded while forming a fixed spaced space, the spaced space has a closed structure in which the air layer is formed. This is defined as "the second air area". A plane shape of the first air area 152 formed by the second adhesive pattern layer 153 may be implemented in various shapes such as a circle, an ellipse, a rectangle, a square, a polygon and the like. Moreover, the adhesive pattern layer may be formed using a heat curing PSA, a heat curing adhesive, an ultraviolet curing PSA type material.

Furthermore, the optical pattern 151 may be formed as the light shielding pattern so that light shielding effects can be implemented in a fixed part to inhibit optical characteristics from being reduced due to the too strong strength of light or a phenomenon of the emission of yellowish light. That is, the light shielding pattern may be printed using a light shielding ink so that the concentration of light is not generated.

The optical pattern may be implemented to adjust a light shielding level and a light diffusing level using only one optical pattern so that the optical pattern can perform the function to partially shield and diffuse light rather than the function to completely shield light. Furthermore, the optical pattern according to the present exemplary embodiment of the invention may be implemented in the overlapping printed structure of a complex pattern. The overlapping printed structure is called a structure which is implemented by forming one pattern and printing another pattern shape on an upper part thereof.

As one example, in implementing the optical pattern 151, the optical pattern may be implemented in the overlapping printed structure of: a diffusion pattern formed on a lower surface of a polymer film in a light emitting direction by using the light shielding ink including one or more materials selected from $TiO_2$, $CaCO_3$, $BaSO_4$, $Al_2O_3$, and silicon; and a light shielding pattern using the light shielding ink including Al or a mixture of Al and $TiO_2$. That is, the optical pattern may be configured such that after the diffusion pattern is formed by white-printing it on the surface of the polymer film, the light shielding pattern is formed thereon, or through an opposite order to this, the optical pattern may be formed in a double structure. Of course, it would be obvious that the design for forming this pattern may be variously modified in consideration of the efficiency and strength of light and a light shielding ratio. Furthermore, in the sequential stacked structure, the optical pattern may be formed in a triple structure in which the light shielding pattern that is a metal pattern is formed in a middle layer, and the diffusion pattern is implemented on its upper part and lower part, respectively. In this triple structure, the optical pattern may be implemented by selecting the aforesaid materials. As preferred one example, the optical pattern may secure the efficiency and uniformity of light through the triple structure in which one diffusion pattern is implemented using $TiO_2$ having an excellent refractive index, another diffusion pattern is implemented using $CaCO_3$ with $TiO_2$ having excellent light stability and color sensitivity, and the light shielding pattern is implemented using Al having excellent obliterating power. In particular, $CaCO_3$ functions to finally implement white light through the function to reduce the exposure of yellowish light, so light having more stable efficiency can be implemented. Furthermore, inorganic materials having a large particle size and a similar structure such as $BaSO_4$, $Al_2O_3$, Silicon beads and the like in addition to $CaCO_3$ may be utilized. Moreover, in view of light efficiency, the optical pattern may be formed by adjusting a density of the optical pattern so that as the LED light sources gradually get away from the light emitting direction, the density of the optical pattern is reduced.

Moreover, the lighting device according to the present exemplary embodiment of the invention may further include an air gap module disposed between the optical pattern layer 150 and the diffusion plate 170. FIG. 10 illustrates an implemented embodiment of the air gap module disposed between the optical pattern layer 150 and the diffusion plate 170 illustrated in FIG. 9.

Referring to FIG. 9 and FIG. 10, to the configuration of the lighting device according to the present exemplary embodiment of the invention, a structure in which the air layer (the third air area 160) is provided between the optical pattern layer 150 and the diffusion plate 170 may be added. Thanks to the presence of the third air area 161, it may be achieved with the effects that the light emitted from the LED light sources can be diffused and uniformity of the light can be enhanced. Moreover, to minimize the deviation of light that penetrates the resin layer 140 and the optical pattern layer 150, a thickness of the third air area 160 may be formed in a range of 0.01 to 2 mm.

The third air area 160 may be formed by implementing a structure in which the air layer may be formed in a lower part of the diffusion plate. The third air area implemented by this structure is defined as "the air gap module".

Figure 11:
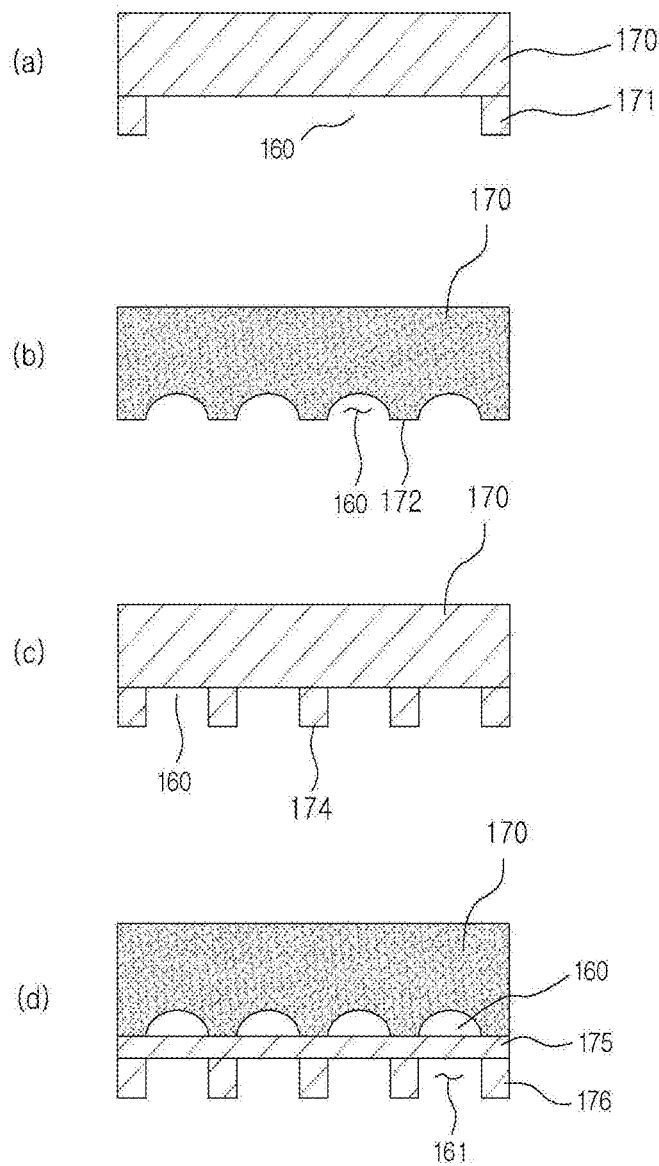

Referring to FIG. 11, the air gap module may include a method of implementing the air area (the air layer) by processing the diffusion plate itself or a configuration of forming the air area by forming a separate construction in the lower part of the diffusion plate. That is, as illustrated in FIG. 11-(a), a spacer 171 is formed in the lower part of the diffusion plate 170 to thereby implement the third air area 160, or as illustrated in FIG. 11-(b), the air gap module may be implemented in a structure of a bridge 172 in which the lower part of the diffusion plate is patterned to thereby adhere to a layer of the lower part, thereby forming the third air area 160.

The integrated structure may be variously modified depending upon the patterned shape, namely, the shape of the pattern that forms the air area. According to this, it would be obvious that a shape of the bridge may be also variously modified. This is also included in the gist of the present invention. Furthermore, like the structure illustrated in FIG. 11-(c), in addition to the method of patterning the low part of the diffusion plate itself, the air gap module may be also implemented in a structure that forms the air area 160 using a separate construction. Of course, the illustrated construction is a spacer member and shows an example of the structure that forms the bridge 174. However, the gist of the present invention includes this method, and various modified embodiments which may implement the air layer in the lower part of the diffusion plate fall also into the gist of the present invention.

Like the drawing illustrated in FIG. 11-(d), in addition to making the air layer as a single layer like the configuration (b) of patterning the diffusion plate itself, or the configuration (c) of using the separate construction, the air areas 160, 161 may be formed as a plurality of layers by employing structures 175, 176 which may implement an independent air layer.

The lighting device according to the present exemplary embodiment of the invention as described above may implement a disposition structure of the LED light sources 130 emitting light as illustrated in FIG. 5. That is, to reduce the number of light sources, the LED light sources 130 may be disposed by applying a side-view light emitting type LED.

The aforesaid lighting device according to the present exemplary embodiment of the invention may be applied to an LCD through the following configurations and functions. Referring to FIG. 9, light is emitted from the side-view light emitting type LED light source 130 in a side direction, the emitted light is reflected and diffused on the resin layer 140 formed instead of the conventional light guide plate. Concentration of the light can be inhibited by the optical pattern layer 150, and deviation of the light can be minimized by the third air area formed in the lower part of the diffusion plate. In particular, thanks to the presence of the reflective unit 120 according to the present exemplary embodiment of the invention disposed between the resin layer 140 and the printed circuit board 110, reflectance can be more improved, the efficiency of light can be maximized, and the effect of the improvement of luminance can be implemented. In particular, in the case of the reflective unit 120 according to the present exemplary embodiment of the invention, the control of reflectance may be implemented by varying a design which implements the air area by patterning the adhesive material layer. Furthermore, there is also an effect that the implementation of different reflectance and colors can be adjusted depending upon a raw material and kind of the patterned adhesive material. Furthermore, reflectance may be adjusted depending upon optical characteristics and a thickness of the second reflective film 122.

To sum it up, because reflection efficiency of the light emitted by the reflective unit 120 and the reflective pattern 124 according to the present exemplary embodiment of the invention becomes higher, the light can be induced forward. Like this, the light passing through the resin layer 140 is diffused or shielded through the optical pattern 151 formed on the optical pattern layer 150. Like this, optical characteristics of the refined light is refined once again through the air gap module formed in the lower part of the diffusion plate, thereby increasing uniformity. The light is incident to an LCD panel as white light through an optical sheet such as a prism sheet 180 and a DBEF 190 which are added later.

Like this, in the case of the lighting device according to the present exemplary embodiment of the invention, thanks to the structure of the reflective unit having the air area, reflection efficiency can be maximized. Furthermore, when implementing the lighting device, the light guide plate is removed, the side-view light emitting type LED is applied as the supply source of light, by diffusing and reflecting light through the resin layer, the light is guided, thereby making a product thin and reducing the number of light sources. Meanwhile, due to the deterioration of luminance and the problem of uniformity caused by the reduction of the light sources may be adjusted by providing the reflective pattern, the shielding pattern and the air area of the air gap module, so optical characteristics can be improved.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A lighting device comprising:
   a plurality of LED light sources fox on a printed circuit substrate;
   a reflective unit stacked on the printed circuit substrate in a structure that the LED light sources penetrate;
   a resin layer stacked on an upper surface of the reflective unit to be higher than a height of the LED light sources; and
   an optical pattern layer in which an optical pattern disposed on an upper part of the resin layer and for diffusing light is implemented,
   wherein the reflective unit comprises:
   a first reflective film;
   a second reflective film on the first reflective film; and
   a first adhesive pattern layer disposed between and in direct physical contact with the first reflective film and the second reflective film, wherein the first adhesive pattern layer comprises a plurality of unit air cells disposed between the first reflective film and the second reflective film and each having a first air area, wherein the unit air cells are connected by openings within the first adhesive pattern layer, and wherein the optical pattern layer comprises a second adhesive pattern layer which forms a second air area surrounding around the optical pattern.

2. The lighting device of claim 1, wherein the optical pattern layer has a first substrate and a second substrate including the optical pattern in an inner part thereof, and the second adhesive pattern layer is coated with remaining parts except for the second air area.

3. The lighting device of claim 1, wherein a plane shape of the second air area formed by the second adhesive pattern layer includes one of a circle, an ellipse, a rectangle, a square, and a polygon.

4. The lighting device of claim 1, further comprising a diffusion plate disposed on an upper part of the optical pattern layer.

5. The lighting device of claim 4, wherein an air gap module having a third air area between the optical pattern layer and the diffusion plate is further provided.

6. The lighting device of claim 5, wherein the air gap module is formed in an integrated structure in which the third air area and a bridge are implemented by patterning a lower part of the diffusion plate.

7. The lighting device of claim 5, wherein the air gap module is formed in a structure having the third air area by forming the bridge as an independent spacer member in the lower part of the diffusion plate.

\* \* \* \* \*